(No Model.) 2 Sheets—Sheet 1.

C. GAGE.
DRILL CHUCK.

No. 294,121. Patented Feb. 26, 1884.

Witnesses:
Wm. E. Skilton
Sidney H. Buxton

Inventor.
Charles Gage (No Model.) 2 Sheets—Sheet 2.

C. GAGE.
DRILL CHUCK.

No. 294,121. Patented Feb. 26, 1884.

Witnesses:
Wm. E. Skelton
Sidney H. Buxton

Inventor.
Charles Gage

UNITED STATES PATENT OFFICE.

CHARLES GAGE, OF SOMERVILLE, ASSIGNOR TO LEWIS B. RUSSELL, OF LYNN, MASSACHUSETTS.

DRILL-CHUCK.

SPECIFICATION forming part of Letters Patent No. 294,121, dated February 26, 1884.

Application filed August 15, 1883. (No model.)

*To all whom it may concern:*

Be it known that I, CHARLES GAGE, a citizen of the United States, residing at Somerville, in the county of Middlesex, in the State of Massachusetts, have invented a new and useful Improvement in Drill-Chucks, of which the following is a specification.

My invention relates to that class of chucks in which the jaws are actuated outward and endwise to close upon and grip the drill; and the object of my invention is to provide a chuck in which the jaws shall have more ample guiding and wearing surface and so remain true. Furthermore, the object of my invention is to provide a chuck that shall be as short as possible, so as to hold the drill more steadily, while increasing the range of capacity of the chuck. I attain these objects by the mechanism illustrated in the accompanying drawings, in which—

Figure 1:
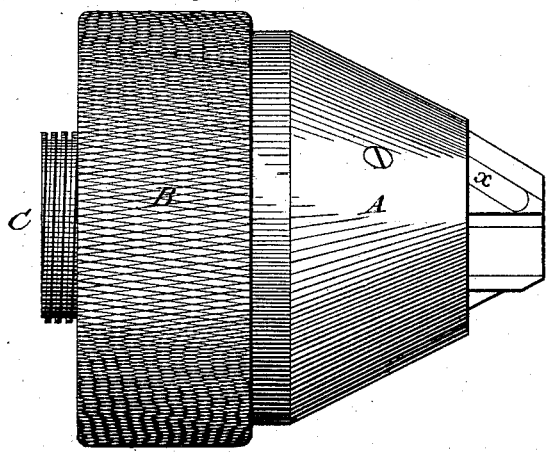
Figure 2:
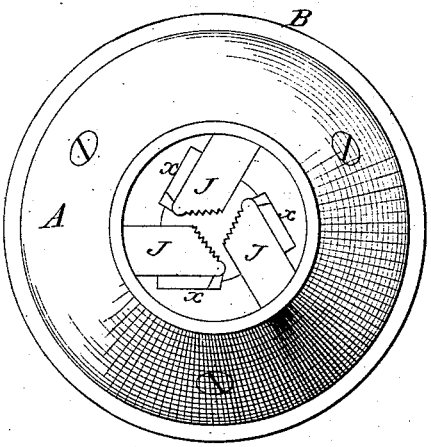
Figure 3:
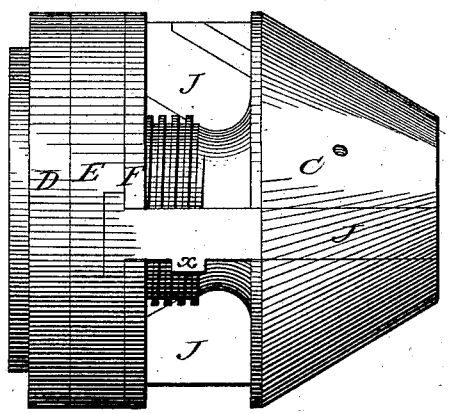
Figure 4:
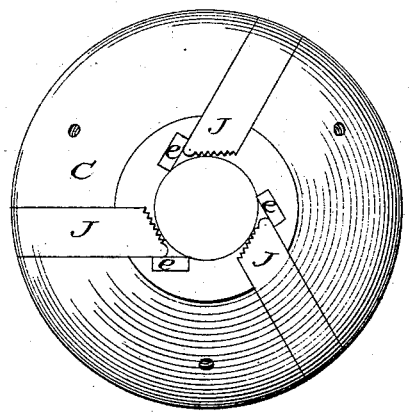
Figure 5:
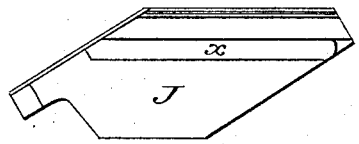
Figure 6:
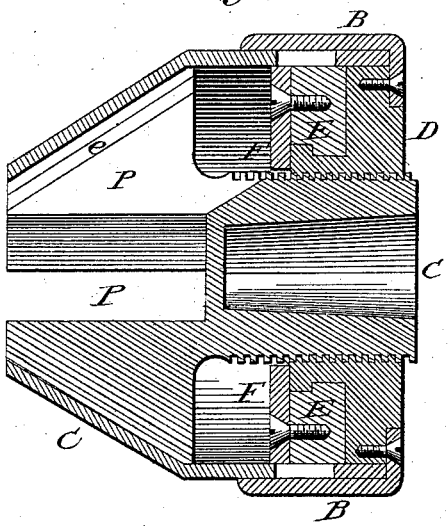

Figure 1 is an outside view of the chuck complete. Fig. 2 is an end view of the same. Fig. 3 is a view of the chuck with the outside casings, A and B, removed to show the internal construction. Fig. 4 is an end view of Fig. 3. Fig. 5 is a view of a jaw removed from the chuck, and Fig. 6 is a sectional side view of the chuck with the jaws removed.

Similar letters refer to like parts throughout the several views.

In the drawings, C is the body of the chuck, having the usual slots or guideways for the jaws J, pierced at one end to receive the driving-arbor, and provided with an external left-hand thread for operating the jaw-moving mechanism.

D is a piece threaded upon C and secured to B.

E is a ring let into D, and provided with a groove to receive the ends of the jaws J.

F is a ring to detain the jaws J in the groove. These two rings have T-shaped radial slots running entirely through their radial or side faces. By making those in E wider than those in F, said T-shaped grooves form guideways for the ends of jaws J in the ring E. The jaws J are provided with a rib or guide-piece, X, fitting into supplementary guideways or recesses, e, formed in the side of the main guideways P, this rib serving to receive the thrust or pressure due to the jaws gripping the drill-shank, and therefore preventing them from moving outward from such pressure. Furthermore, the T-groove formed by E and F maintains the ends of the jaws at a right angle to the chuck-axis, and thus secures them against the gripping-pressure, so that the jaws are secured in a longitudinal direction, and also in a direction at a right angle to the chuck-axis, their durability being thereby greatly increased, while a more forcible grip may be had without straining the chuck.

The operation is as follows: To close the chuck, the casing B is revolved upon the body C, causing the piece D and the rings E and F to move parallel to the chuck-axis, and the jaws to move longitudinally and inward toward the chuck-axis. Conversely, by revolving B in the opposite direction, the jaws are moved longitudinally, and at the same time recede from the chuck-axis.

Having thus described my invention, what I claim as new, and desire to secure by Letters Patent, is—

In a drill-chuck, the combination of the body-piece C, having the jawways P and the supplemental guideways, e, with the jaws J, having ribs X, and the rings E and F, substantially as set forth.

CHARLES GAGE.

Witnesses:
W. J. CAMBRIDGE,
R. J. MURRAY.